United States Patent
Itkin et al.

(10) Patent No.: US 10,496,582 B1
(45) Date of Patent: Dec. 3, 2019

(54) FLEXIBLE MULTI-DOMAIN GPIO EXPANSION

(71) Applicant: Mellanox Technologies, Ltd., Yokneam (IL)

(72) Inventors: Yuval Itkin, Zoran (IL); Yaniv Strassberg, Nesher (IL)

(73) Assignee: MELLANOX TECHNOLOGIES, LTD., Yokneam (IL)

( * ) Notice: Subject to any disclaimer, the term of this patent is extended or adjusted under 35 U.S.C. 154(b) by 0 days.

(21) Appl. No.: 16/122,919

(22) Filed: Sep. 6, 2018

(51) Int. Cl.
G06F 13/20 (2006.01)
G06F 13/42 (2006.01)
G06F 13/40 (2006.01)

(52) U.S. Cl.
CPC .......... *G06F 13/4022* (2013.01); *G06F 13/20* (2013.01); *G06F 13/4282* (2013.01); *G06F 2213/0002* (2013.01)

(58) Field of Classification Search
CPC .......... G06F 13/14; G06F 13/20; G06F 13/36; G06F 13/362; G06F 13/3625; G06F 13/368; G06F 13/372; G06F 13/38; G06F 13/13; G06F 13/382; G06F 13/385; G06F 13/387; G06F 13/40; G06F 13/4004; G06F 13/4009; G06F 13/4022; G06F 13/4027; G06F 13/4063; G06F 13/4068; G06F 13/4221; G06F 13/4282; G06F 2212/0012
See application file for complete search history.

(56) References Cited

U.S. PATENT DOCUMENTS

| | | | | |
|---|---|---|---|---|
| 4,720,798 A | * | 1/1988 | Reed | H05K 3/0008 |
| | | | | 118/410 |
| 8,521,931 B2 | | 8/2013 | Sinykin et al. | |
| 9,966,961 B1 | * | 5/2018 | He | H03K 19/17744 |
| 2003/0154331 A1 | * | 8/2003 | Bader | G06F 1/22 |
| | | | | 710/12 |
| 2012/0185626 A1 | * | 7/2012 | Stuhlsatz | G06F 13/4022 |
| | | | | 710/105 |
| 2016/0285757 A1 | * | 9/2016 | Srivastava | H04L 12/10 |
| 2018/0189222 A1 | * | 7/2018 | Srivastava | G06F 13/287 |
| 2018/0260585 A1 | * | 9/2018 | Dondini | G06F 13/4068 |

OTHER PUBLICATIONS

"SFF Committee SFF-8485 Specification for Serial GPIO (SGPIO) Bus", Revision 0.7, 39 pages, Feb. 1, 2006.

* cited by examiner

*Primary Examiner* — Thomas J. Cleary
(74) *Attorney, Agent, or Firm* — Kligler & Associates

(57) ABSTRACT

An Integrated Circuit (IC) includes two or more subsystem circuits, a multiplexed bus, a multiplexer/de-multiplexer (MUX/DEMUX) and a logic circuit. The subsystems are independent of one another and are configured to communicate data over multiple General-Purpose Input-Output (GPIO) ports. The multiplexed bus is configured to communicate with circuitry external to the IC. The MUX/DEMUX is configured to translate between the data communicated by the subsystem circuits over the multiple GPIO ports and the multiplexed bus. The logic circuit is independent of the subsystem circuits and is configured to allocate resources of the MUX/DEMUX among the subsystem circuits in response to requests received from the subsystem circuits, and to configure the MUX/DEMUX to provide the allocated resources to the subsystem circuits.

19 Claims, 3 Drawing Sheets

FLEXIBLE MULTI-DOMAIN GPIO EXPANSION

FIELD OF THE INVENTION

The present invention relates generally to digital systems, and particularly to methods and systems for the expansion of General-Purpose Input-Output ports (GPIO) in a System on Chip (SOC) having multiple isolated subsystems.

BACKGROUND OF THE INVENTION

Systems on Chip (SOC) typically comprise a multitude of separate sub-systems, which are integrated in the same Application-Specific Integrated Circuit (ASIC). Additionally, some or all the sub-systems may connect to modules which are external to the ASIC, through ASIC input/output ports. The input/output ports may sometimes be multiplexed on the SOC pads.

Techniques for multiplexing General Purpose IO (GPIO) are described, for example, in "SFF Committee SFF-8485 Specification for Serial GPIO (SGPIO) Bus," Revision 0.7, Feb. 1, 2006, which is incorporated herein by reference.

SUMMARY OF THE INVENTION

An embodiment of the present invention that is described herein provides an Integrated Circuit (IC). The IC includes two or more subsystem circuits, a multiplexed bus, a multiplexer/de-multiplexer (MUX/DEMUX) and a logic circuit. The subsystem circuits are independent of one another, and are configured to communicate data over multiple General-Purpose Input-Output (GPIO) ports. The multiplexed bus is configured to communicate with circuitry external to the IC. The MUX/DEMUX is configured to translate between the data communicated by each of the associated subsystem circuits over the multiple GPIO ports and the multiplexed bus. The logic circuit is independent of the subsystem circuits and is configured to allocate resources of the MUX/DEMUX among the subsystem circuits in response to the requests received from the subsystem circuits, and to configure the MUX/DEMUX to provide the allocated resources to the subsystem circuits.

In an embodiment, the MUX/DEMUX is connected to the subsystem circuits by respective maximal numbers of GPIO ports, the requests specify respective actual numbers of GPIO ports requested by the subsystem circuits, and the logic circuit is configured to configure the MUX/DEMUX to provide the subsystem circuits with the requested actual numbers of GPIO ports. According to an embodiment of the present invention, the logic circuit is configured to allocate the resources of the MUX/DEMUX, and to configure the MUX/DEMUX, upon initialization of the IC. In some embodiments, the MUX/DEMUX includes a serializer/de-serializer (SERDES). In yet other embodiments, the multiplexed bus is a serial bus. In an embodiment, the configuration requests from the subsystem circuits are provided to the logic circuit at different times.

There is additionally provided, in accordance with an embodiment of the present invention, an electronic apparatus. The electronic apparatus includes an Integrated Circuit (IC) and an external MUX/DEMUX. The IC includes two or more subsystem circuits, a multiplexed bus, a multiplexer/de-multiplexer (MUX/DEMUX), and a logic circuit. The subsystem circuits are independent of one another and are configured to communicate data over multiple General-Purpose Input-Output (GPIO) ports. The multiplexed bus is configured to communicate with circuitry external to the IC. The MUX/DEMUX is configured to translate between the data communicated by the subsystem circuits over the multiple GPIO ports and the multiplexed bus. The logic circuit is independent of the subsystem circuits and is configured to allocate resources of the MUX/DEMUX among the subsystem circuits in response to requests received from the subsystem circuits, and to configure the MUX/DEMUX to provide the allocated resources to the subsystem circuits. The external MUX/DEMUX is configured to communicate with the IC using the multiplexed bus, and to re-translate between the multiplexed bus and the data communicated over the multiple GPIO ports.

In an embodiment, the apparatus includes a circuit board, and the IC and the external MUX/DEMUX are mounted on the circuit board.

There is additionally provided, in accordance with some embodiment of the present invention, a method including communicating data in an Integrated Circuit (IC) over multiple General-Purpose Input-Output (GPIO) ports by two or more subsystem circuits that are independent of one another, and translating, using a multiplexer/de-multiplexer (MUX/DEMUX) in the IC, between the data communicated by the subsystem circuits over the multiple GPIO ports and a multiplexed bus that communicates with circuitry external to the IC. Resources of the MUX/DEMUX are allocated among the subsystem circuits in response to requests received from the subsystem circuits. The MUX/DEMUX is configured to provide the allocated resources to the subsystem circuits.

The present invention will be more fully understood from the following detailed description of the embodiments thereof, taken together with the drawings in which:

DETAILED DESCRIPTION OF EMBODIMENTS

Overview

Figure 1:
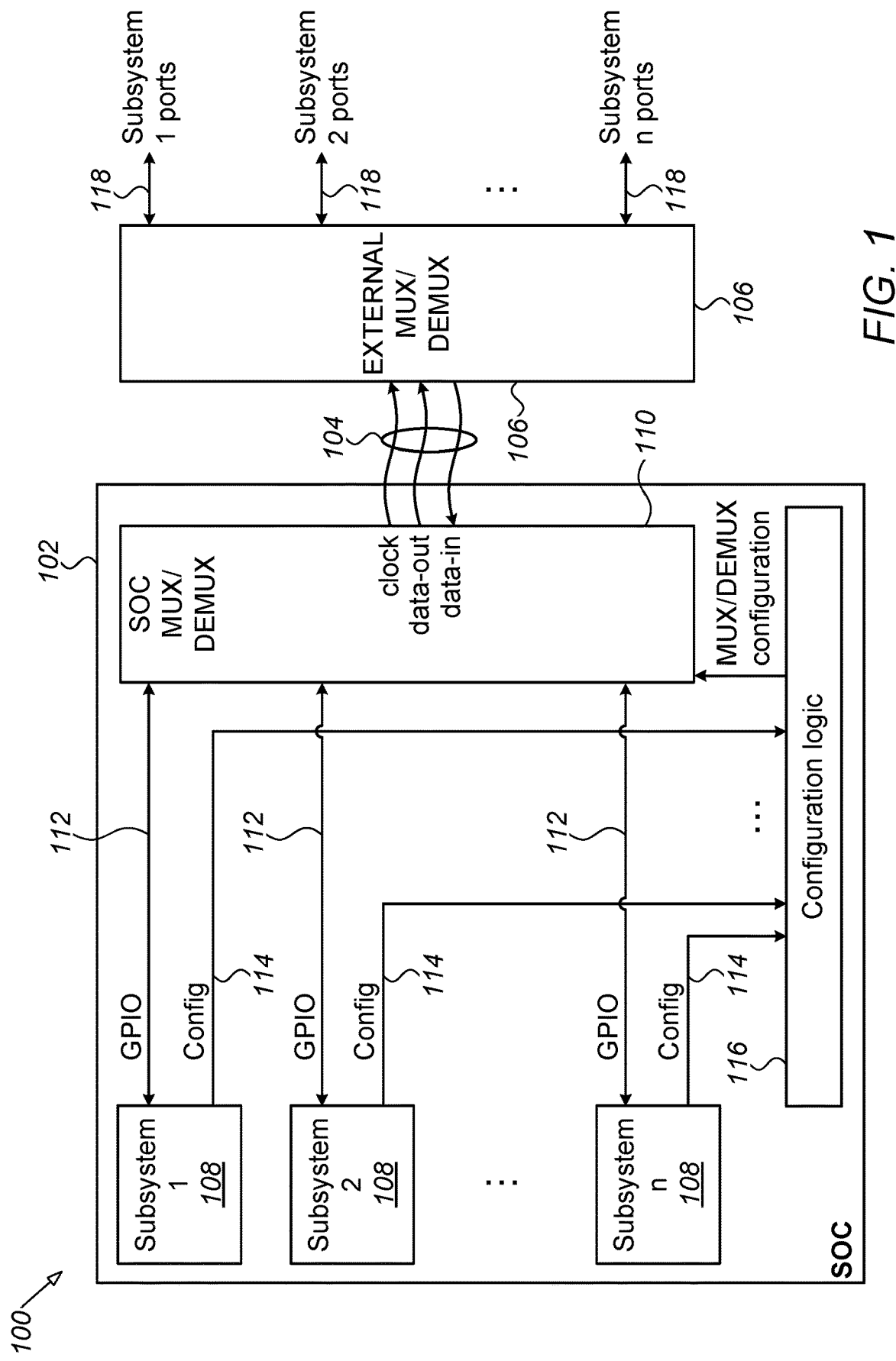
FIG. 1 is a block diagram that schematically illustrates a SOC with GPIO expansion, in accordance with an embodiment of the present invention.

System on Chip (SOC) integrated circuits with increasing density and complexity are widely used. SOCs may comprise a plurality of subsystems, including, for example, central processing units, communication controllers, memories and other general purpose as well as dedicated functionality modules. These subsystems may be independent from each other, so that one subsystem is not allowed to modify the configuration and/or operating mode of another subsystem, e.g., for security reasons or a need for independent operation of each subsystem. Additionally, these subsystems may be in different operational state at a given point in time, such that one or more subsystem may be active while another subsystem(s) may not be active at that time.

In embodiments of the present invention, the SOC is mounted on a Printed Circuit Board (PCB); some of the subsystems of an SOC comprise General Purpose IO (GPIO) ports, which are to be connected through pads of the SOC, to other devices on the PCB, or on other PCBs. To save SOC pads, some of the GPIO ports are multiplexed onto a smaller number of SOC pads, which are then expanded in the PCB by an external expanding multiplexer/demultiplexer (referred to hereinbelow as mux/demux) device. The mux/demux may be implemented, for example, in a Complex Programmable Logic Device (CPLD). The CPLD is typically, but not necessarily, mounted on the same PCB with the SOC.

The external mux/demux device expands the GP-outputs that it receives from the SOC by driving the output levels of the mux/demux device as originally generated by the SOC's subsystems. Similarly, the same or a different mux/demux device may multiplex inputs from several ports on the PCB (or in other PCBs) and send them multiplexed to a smaller number of SOC pins, wherein the pads are demultiplexed and wired to GP-inputs of subsystems in the SOC. As a result, the GPIO ports of subsystems within the SOC are mirrored to pads in a device outside the SOC.

The Multiplexing and demultiplexing that are performed by the SOC, and by the external mux/demux device, essentially translate between the data communicated by the subsystem circuits over the multiple GPIO ports and the multiplexed bus.

According to embodiments, the same SOC may be used in a variety of configurations that require different numbers of GPIO ports of the various subsystems. The multiplex scheme, therefore, may vary with different SOC configurations.

In some embodiments, the SOC comprises a configurable IO multiplexer/demultiplexer (mux/demux), which is configured based on requests from subsystems of the SOC, e.g., upon SOC initialization. According to embodiments, each subsystem sends configuration information (for example, the number of GPIO ports that it requires) to an independent logic circuit in the SOC that is coupled to the IO multiplexer/demultiplexer (mux/demux). The independent logic circuit (independent of the subsystems) then automatically configures the mux/demux to fit the SOC GPIO configuration.

In one example embodiment, each subsystem is connected within the SOC to the configurable mux/demux by a respective maximal number of GPIO ports (which may differ from one subsystem to another). On subsystem initialization, each subsystem sends configuration information, which notifies the logic circuit in the SOC of the actual number of off-chip expanded GPIO ports needed by that subsystem. The independent logic circuit receives the configuration information from the various subsystems and configures the mux/demux to allocate the actual number of GPIO ports requested by each subsystem, thus allowing each subsystem to be served independently by the logic circuit.

In some embodiments, the logic circuit sums the actual numbers of GPIO ports that the subsystems request, and, if the sum exceeds the capacity of the multiplexed bus, asserts a configuration-error flag.

The disclosed configuration process need not necessarily be performed only on initialization or at the same time. In some embodiments, the subsystems may send their configuration information upon a reconfiguration event of each of the respective subsystems, which may be signaled to the subsystems by other circuits of the SOC (typically by a processor and/or a reset logic), and/or by an external port of the SOC. Thus, the GPIO configuration may change dynamically—e.g., during initialization and/or when a configuration change is required. In other embodiments, the subsystems may use a fixed configuration, and configuration changes will not be needed.

Thus, according to embodiments of the present invention, a plurality of GPIO configurations, pertaining to a plurality of SOC configurations, can be automatically supported using the same hardware. Similarly, according to embodiments of the present invention, the SOC can be used in variety of systems, each requiring a different GPIO configuration, all using the same SoC device type. The disclosed techniques are not limited to SOCs, and may be used in any other suitable type of IC.

SYSTEM DESCRIPTION

FIG. 1 is a block diagram that schematically illustrates GPIO expansion, in accordance with an embodiment of the present invention.

A Computer System 100 comprises a System-On-Chip (SOC) 102, A Multiplexed Bus 104, which, in the example embodiment of FIG. 1, is a serial bus comprising a clock-out, and data-out and a data-in wires; and, an External Multiplexer/Demultiplexer (Ext-MUX/DEMUX) 106 (Ext-MUX/DEMUX can be, for example, a Serializer/De-serializer). SOC 102 comprises a plurality of subsystems 108, each of which comprising a general-purpose Input-Output bus (GPIO) 112 (the GPIOs are not necessarily grouped into a single bus, as these signals could be associated with different functionalities; the term "bus" used herein means any group of signals). According to embodiments of the present invention, each subsystem 108 sends a configuration word 114 to a Configuration independent Logic circuit 116 that is not part of any of the subsystems, which controls the configuration of a System-on-Chip Multiplexer/Demultiplexer (SOC-MUX/DEMUX) 110 (SOC-MUX/DEMUX can be, for example, a Serializer/De-serializer). SOC-MUX/DEMUX 110 is configured to receive its configuration from Configuration Logic circuit 116, receive the GPIO wires from subsystems 108, multiplex the GPIO wires, and send the multiplexed data over Multiplexed Bus 104, to Ext-MUX/DEMUX 106, which may comprise, for example a Complex Programmable Logic Device (CPLD).

We will refer hereinbelow to the Ext-MUX/DEMUX 106 as the peer MUX/DEMUX of SOC-MUX/DEMUX 110, and to SOC-MUX/DEMUR 110 as the peer MUX/DEMUX of Ext-MUX/DEMUX 106.

External-MUX/DEMUX 106 is configured to receive multiplexed data that represents some or all the GPIO wires of subsystems 108 from Multiplexed Bus 104, to convert the multiplexed bus to non-multiplexed data, and to drive subsystem ports 118 with non-multiplexed data, corresponding to the data that subsystems 108 send over GPIO buses 112.

In some embodiments, wires of subsystem ports 118, which corresponds to wires of GPIO 112 that are inputs to subsystems 108, are not driven by Ext-MUX/DEMUX 106.

Ext-MUX/DEMUX 106 is further configured to receive parallel data on Sub-System Ports 118, to multiplex the data to a multiplexed bus and send the multiplexed data over Multiplexed Bus 104, to SOC-MUX-DEMUX 110 of SOC 102. SOC-MUX-DEMUX 110 is configured to receive a multiplexed data from Multiplexed Bus 104, to convert the multiplexed data to parallel data, and to drive GPIO 112 buses with the parallel data, so that each subsystem 108 will get on its GPIO buses 112 the data that Ext-MUX/DEMUX 106 receives at Sub-System Ports 118.

In some embodiments, wires of GPIO 112, which are outputs of subsystems 108, are not driven by SOC-MUX/DEMUR 110.

Thus, according to the example embodiment of FIG. 1, subsystems of SOC 102 automatically configure the GPIO of the SOC.

The configurations of SOC 102, Communication Bus 104 and ext-MUX/DEMUX 106 are example configurations that are shown purely for the sake of conceptual clarity. Any other suitable configurations can be used in alternative embodiments. For example, Mux/Demux Bus 104 may comprise two clocks (one for each direction), fiber optics medium, embedded clock transmission or wireless transmission. The Ext-MUX/DEMUX may be embedded in other chips on the PCB, or, in another example, it may be distributed in several devices on the PCB or on several PCBs.

In the present example, Configuration Logic circuit 116 allocates respective numbers of GPIO ports to the various subsystems. In alternative embodiments, however, any other suitable resource of SOC-MUX/DEMUX 110 can be allocated in this manner. For example, BUS 104 may comprise a small number of fast I/O channels (e.g., balanced differential pairs), and a larger number of slow I/O channels (e.g. unbalanced parallel wires). SOC-MUX/DEMUR 110 may be configured by Configuration Logic circuit 116 to allocate the fast and the slow channels according to the requirements of the subsystems.

Figure 2:
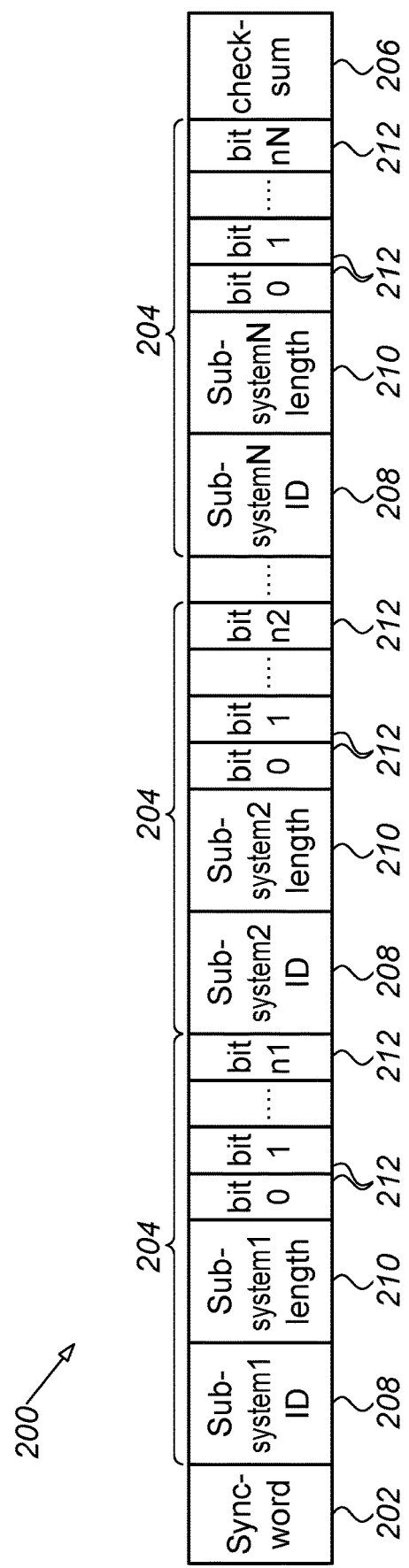
FIG. 2 is a table the schematically presents the bits of the protocol word that is sent over a multiplexed bus, according to embodiments of the present invention.

FIG. 2 is a table the schematically presents the bits of a protocol word 200 that is sent over Multiplexed Bus 104 (FIG. 1), according to embodiments of the present invention. The protocol comprises a Sync-Word 202, which comprises a unique code that the peer mux/demux can identify and use as an indication that a transmission of data starts; a plurality of sub-system words 204, and a checksum word 206, which is configured to provide a checksum of the bits of the protocol word.

In the example embodiment of FIG. 2, sub-system words 204 comprise a Subsystem ID field 208, which is configured to comprise unique code for each subsystem; a Length field 210, which comprises a binary representation of the number of IO bits for each subsystem; and, Bit Fields 212, which comprise the logic states of the GPIO bits of each subsystem.

In embodiments, the same protocol word is sent from SOC-MUX/DEMUX 110 to Ext-MUX/DEMUX 106 (FIG. 1) and from Ext-MUX/DEMUX 106 to SOC-MUX/DEMUX 110, except that in the bit fields, the binary value of GPIO wires that are output from subsystems 108 are undefined in the protocol word that is sent over the Data-out wire of Mux/demux Bus 104 (FIG. 1), and the binary value of GPIO wires that are input to subsystems 108 is undefined in the protocol word that is sent over the Data-in wire.

Thus, according to the example embodiment of FIG. 2, SOC-MUX/DEMUX 110 (FIG. 1) automatically sends the number of GPIO ports for each subsystem 108 according to the length field that the Configuration Logic circuit 116 receives from the subsystems, and further configuration programming of the SOC's GPIO is not required.

Protocol 200 is an example configuration that is shown purely for the sake of conceptual clarity. Any other suitable protocol can be used in alternative embodiments. For example, sync word 202 may be replaced by a sync wire that will be added to multiplexed bus 104, or the sync wire nay be replaced by signaling on the clock wire. The ID and/or the length fields may be omitted from the protocol (as they are known to the Ext-MUX-DEMUX); and checksum word 206 may be omitted; Similarly, a subsystem-checksum word may be added to each of the subsystem words 204.

Figure 3:
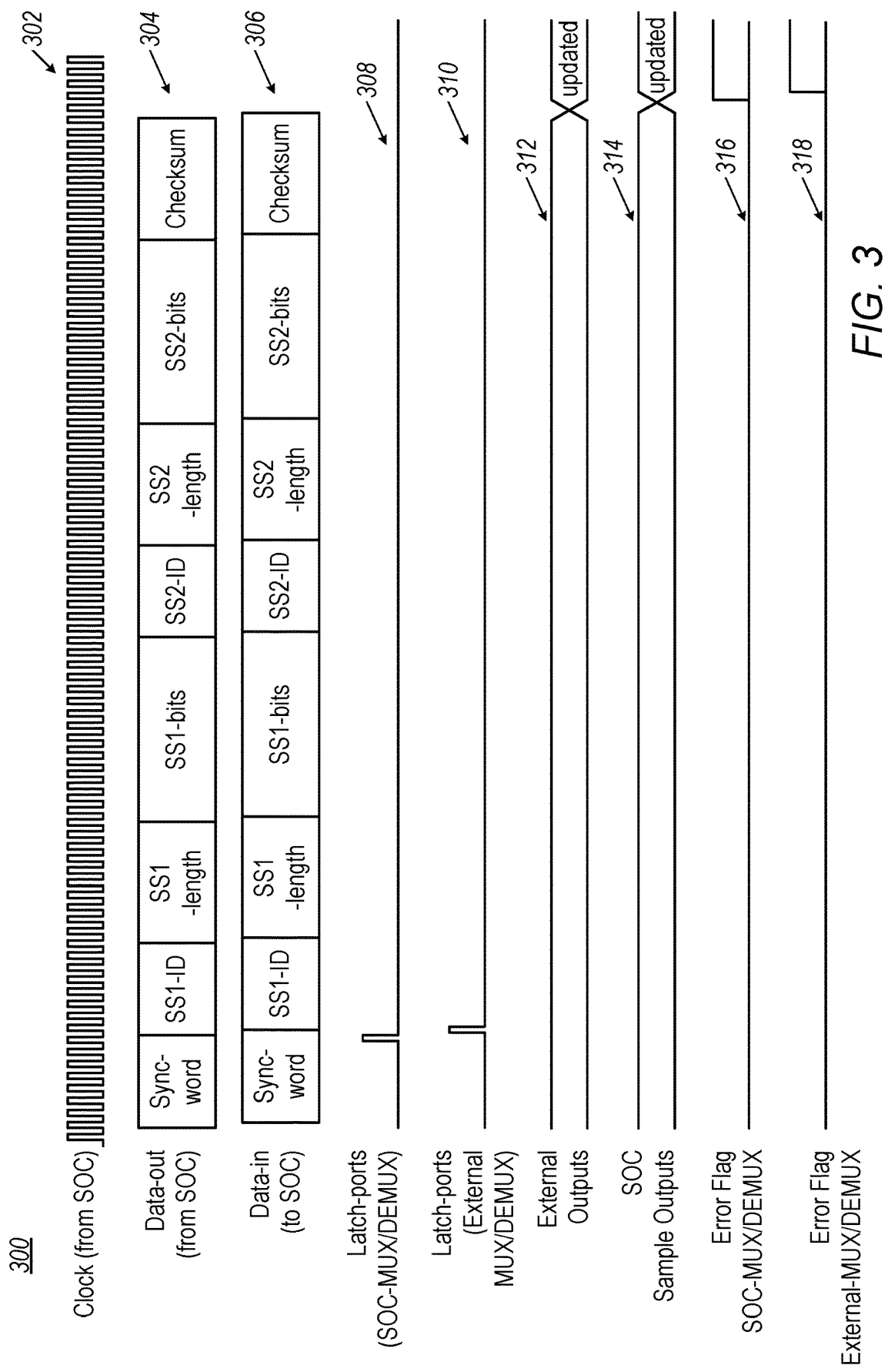
FIG. 3 is a timing chart that schematically describes the timing of key signals according to some embodiments of the present invention.

FIG. 3 is a timing chart 300 that schematically describes the timing of some key signals according to some embodiments of the present invention. The timing chart comprises: A Clock signal 302, corresponding to the clock wire of Multiplexed bus 104 (FIG. 1); a Data-Out signal 304, corresponding to the data-out wire of the multiplexed bus; a data-in signal 306, corresponding to the data-in wire of the multiplexed bus; a Latch-Ports-SOC signal 308; a Latch-Ports-External signal 310, an External-Outputs signal 312; an SOC Inputs signal 314; an Error-Flag-SOC signal 316; and, an Error-Flag-External signal 318.

Signals 304 and 306 comprise the fields described in FIG. 2 above. In the example embodiment of FIG. 3, there are two subsystems, and, accordingly, two subsystem words 204 are sent. According to embodiments, data-in signal 306 may lag after data-out signal 304 when the clock that signals 304 and 306 are synchronized to is generated in the SOC; in the example embodiment of FIG. 3 data-in signal 306 lags after data-out signal 304 by half a clock cycle; other suitable delays may be used in other embodiments.

According to an embodiment, SOC-MUX/DEMUX 110 (FIG. 1) sample the output ports prior to the multiplexing and Ext-MUX/DEMUX 106 (FIG. 1) sample the input ports prior to the multiplexing. In the example embodiment of FIG. 3, SOC-MUX/DEMUX 110 samples the GPIO buses after it generates sync word 202 (FIG. 2), whereas Ext-MUX/DEMUX 106 samples the GPIO inputs after it receives the sync word. Signals 308 and 310 indicate the time when the SOC-MUX/DEMUR and the Ext-MUX/DEMUX, respectively, sample the buses.

Signals 312 and 314 show the timing when the GPIO buses are updated, in the Ext-MUX/DEMUX and the SOC-MUX/DEMUR, respectively. In the example embodiment, a peer mux/demux updates the GPIO buses after it receives a complete protocol word 202 (FIG. 2).

According to the example embodiment, the SOC-MUX/DEMUR and the Ext-MUX/DEMUX may assert error flags (not shown in FIG. 1) if the checksum check fails. The error flag signals are illustrated in 316 and 318.

The timing waveform described in FIG. 3 may repeat continuously; that is, new data-out signal 304 and data-in signal 306 may be sent right after a current data-out and data-in signals completes. Alternatively, sending of the signals may be done periodically, or as directed by a controller (not shown).

Thus, according to the example embodiment of FIG. 3, GPIO bits are sent from the SOC to the Ext-MUX/DEMUX, and from the Ext-MUX/DEMUX to the SOC; the embedded GPIO ports 112 are mirrored outside the SOC, according to the configuration set by subsystems 108 of SOC 102.

The timing waveform of FIG. 3 are an example that is shown purely for the sake of conceptual clarity. Any other suitable timing can be used in alternative embodiments. For example, the timing when the GPIO is latched may be different; some or all the GPIO may not be latched; and the error flags may be omitted.

Support of Bidirectional GPIO

Embodiments of the present invention support expansion of bidirectional input-output GPIO, which may be mixed with input and output GPIO ports. Support of bidirectional GPIO may be done, for example, by sending from the subsystems to the SOC-MUX-DEMUX 2 bits for each bidirectional GPIO—a first bit that indicates the direction of the GPIO (e.g.—logic 1 for input and logic 0 for output), and a second bit that indicates the logic value of the GPIO wire.

The configuration, protocol and waveform described hereinabove are examples that are shown purely for the sake of conceptual clarity. Any other suitable configurations, protocols and waveform can be used in alternative embodiments. For example, FIG. 1 show two mux/demuxes. Any or both could be implemented by software, or by combination of hardware and software.

Ext-MUX/DEMUX 106 may be implemented using suitable hardware, such as in an Application-Specific Integrated Circuit (ASIC) or Field-Programmable Gate Array (FPGA), using software, using hardware, or using a combination of hardware and software elements. In some embodiments, SOC-MUX/DEMUR 110, Ext-MUX/DEMUX 106 and/or Configuration Logic circuit 116 may be implemented using an independent general-purpose programmable processor, which is programmed in software to carry out the functions described herein. The software may be downloaded to the processor in electronic form, over a network, for example, or it may, alternatively or additionally, be provided and/or stored on non-transitory tangible media, such as magnetic, optical, or electronic memory.

It will thus be appreciated that the embodiments described above are cited by way of example, and that the present invention is not limited to what has been particularly shown and described hereinabove. Rather, the scope of the present invention includes both combinations and sub-combinations of the various features described hereinabove, as well as variations and modifications thereof which would occur to persons skilled in the art upon reading the foregoing description and which are not disclosed in the prior art. Documents incorporated by reference in the present patent application are to be considered an integral part of the application except that to the extent any terms are defined in these incorporated documents in a manner that conflicts with the definitions made explicitly or implicitly in the present specification, only the definitions in the present specification should be considered.

The invention claimed is:

1. An Integrated Circuit (IC), comprising:
two or more subsystem circuits, which are independent of one another and are configured to communicate data over multiple General-Purpose Input-Output (GPIO) ports;
a multiplexed bus, configured to communicate with circuitry external to the IC;
a multiplexer/de-multiplexer (MUX/DEMUX), which is configured to translate between the data communicated by the subsystem circuits over the multiple GPIO ports and the multiplexed bus; and
a logic circuit, which is independent of the subsystem circuits and is configured to receive from each of the subsystem circuits a request indicating a number of ports needed by the subsystem, to allocate resources of the MUX/DEMUX among the subsystem circuits in response to the requests received from the subsystem circuits, and to configure the MUX/DEMUX to provide the allocated resources to the subsystem circuits.

2. The IC according to claim 1, wherein the MUX/DEMUX is connected to the subsystem circuits by respective maximal numbers of GPIO ports, wherein the requests specify respective actual numbers of GPIO ports requested by the subsystem circuits, and wherein the logic circuit is configured to configure the MUX/DEMUX to provide the subsystem circuits with the requested actual numbers of GPIO ports.

3. The IC according to claim 2, wherein the request indicating a number of ports comprises for each GPIO port a single bit indicating a logical state of the port.

4. The IC according to claim 2, wherein the request indicating a number of ports comprises for each of the GPIO ports two bits indicating a logical state of the port and a direction of the port.

5. The IC according to claim 1, wherein the logic circuit is configured to allocate the resources of the MUX/DEMUX, and to configure the MUX/DEMUX, upon initialization of the IC.

6. The IC according to claim 1, wherein the MUX/DEMUX comprises a serializer/deserializer (SERDES).

7. The IC according to claim 1, wherein the multiplexed bus is a serial bus.

8. The IC according to claim 1, wherein the configuration requests from the subsystem circuits are provided to the logic circuit at different times.

9. The IC according to claim 1, wherein the subsystem circuits are configured to send the requests to the logic circuit upon a reconfiguration of the subsystem and the logic circuit is configured to change the resource allocation dynamically when one or more of the subsystem circuits reconfigures.

10. An electronic apparatus, comprising:
an Integrated Circuit (IC), which comprises:
two or more subsystem circuits, which are independent of one another and are configured to communicate data over multiple General-Purpose Input-Output (GPIO) ports;
a multiplexed bus, configured to communicate with circuitry external to the IC;
a multiplexer/de-multiplexer (MUX/DEMUX), which is configured to translate between the data communicated by the subsystem circuits over the multiple GPIO ports and the multiplexed bus; and
a logic circuit, which is independent of the subsystem circuits and is configured to receive from each of the subsystem circuits a request indicating a number of ports needed by the subsystem, to allocate resources of the MUX/DEMUX among the subsystem circuits in response to the requests received from the subsystem circuits, and to configure the MUX/DEMUX to provide the allocated resources to the subsystem circuits; and
an external MUX/DEMUX, which is configured to communicate with the IC using the multiplexed bus, and to re-translate between the multiplexed bus and the data communicated over the multiple GPIO ports.

11. The apparatus according to claim 10, and comprising a circuit board, wherein the IC and the external MUX/DEMUX are mounted on the circuit board.

12. A method, comprising:
in an Integrated Circuit (IC) including two or more subsystem circuits that are independent of one another, wherein each subsystem circuit includes multiple General-Purpose Input-Output (GPIO) ports, sending by each of the subsystems a request indicating a number of required GPIO ports;
allocating resources of a multiplexer/de-multiplexer (MUX/DEMUX) in the IC among the subsystem circuits in response to the requests received sent from the subsystem circuits, and configuring the MUX/DEMUX to provide the allocated resources to the subsystem circuits; and
translating, using the MUX/DEMUX, between the data communicated by the subsystem circuits over the multiple GPIO ports and a multiplexed bus that communicates with circuitry external to the IC, in accordance with the allocated resources.

13. The method according to claim 12, wherein the MUX/DEMUX is connected to the subsystem circuits by respective maximal numbers of GPIO ports, wherein the requests specify respective actual numbers of GPIO ports requested by the subsystem circuits, and wherein configuring the MUX/DEMUX comprises providing the subsystem circuits with the requested actual numbers of GPIO ports.

14. The method according to claim 12, wherein allocating the resources of the MUX/DEMUX, and configuring the MUX/DEMUX, are performed upon initialization of the IC.

15. The method according to claim 12, wherein the MUX/DEMUX comprises a serializer/deserializer (SER-DES).

16. The method according to claim 12, wherein the multiplexed bus is a serial bus.

17. The method according to claim 12, wherein allocating the resources of the MUX/DEMUX, and configuring the MUX/DEMUX, are performed upon initialization of the subsystem circuits in the IC.

18. The method according to claim 12, and comprising, using an external MUX/DEMUX, communicating with the IC using the multiplexed bus, and re-translating between the multiplexed bus and the data communicated over the multiple GPIO ports.

19. The method according to claim 18, wherein the IC and the external MUX/DEMUX are mounted on a same circuit board.

* * * * *